US009279666B1

(12) United States Patent
Balasubramaniam et al.

(10) Patent No.: US 9,279,666 B1
(45) Date of Patent: Mar. 8, 2016

(54) SYSTEM AND METHOD FOR MONITORING STRAIN (71) Applicant: GENERAL ELECTRIC COMPANY, Schenectady, NY (US)

(72) Inventors: Mahadevan Balasubramaniam, Ballston Lake, NY (US); Slawomir Rubinsztajn, Ballston Spa, NY (US); Glen Peter Koste, Niskayuna, NY (US); Kaustubh Ravindra Nagarkar, Clifton Park, NY (US); Vincent Frank Rubino, Stow, OH (US); Jeffrey Roy Rudd, Akron, OH (US); Paul Jeffrey Gillespie, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/558,170

(22) Filed: Dec. 2, 2014

(51) Int. Cl.
*G01L 1/24* (2006.01)
*G01B 11/16* (2006.01)

(52) U.S. Cl.
CPC .................................. *G01B 11/165* (2013.01)

(58) Field of Classification Search
CPC ...................................................... G01B 11/165
USPC ............................................................. 73/800
See application file for complete search history.

(56) References Cited

U.S. PATENT DOCUMENTS

| | | | |
|---|---|---|---|
| 5,485,745 A | 1/1996 | Rademaker et al. | |
| 6,042,303 A | 3/2000 | Head | |
| 6,736,156 B2 | 5/2004 | Beals et al. | |
| 6,947,647 B2 | 9/2005 | Beals et al. | |
| 7,277,162 B2 | 10/2007 | Williams | |
| 7,461,561 B2 | 12/2008 | Morrison et al. | |
| 8,408,064 B2 | 4/2013 | Hartog et al. | |
| 8,720,584 B2 | 5/2014 | Zediker | |
| 2013/0287501 A1 | 10/2013 | Brower | |
| 2014/0014354 A1 | 1/2014 | Nellessen | |

OTHER PUBLICATIONS

Brower et al., "Advanced Deepwater Monitoring System", ASME 2013 32nd International Conference on Ocean, Offshore and Arctic Engineering, ASME Proceedings, Offshore Technology, Jun. 9-14, 2013, Paper No. OMAE2013-10920, pp. 1-10, Conference Location: Nantes, France.

Wang et al., "Passive cable laying system for subsea cabled observatory",Underwater Technology (UT), 2011 IEEE Symposium on and 2011 Workshop on Scientific Use of Submarine Cables and Related Technologies (SSC), IEEE Xplore, Apr. 5-8, 2011, pp. 1-5, Conference Location: Tokyo.

*Primary Examiner* — Lisa Caputo
*Assistant Examiner* — Roger Hernandez-Prewitt
(74) *Attorney, Agent, or Firm* — Andrew J. Caruso (57) ABSTRACT

A system is provided for monitoring strain in a substrate using a strain sensor element within a fiber optic sensing cable. Accurate and rapid measurement of strain of remote substrates presents major technical challenges and is the focus of much of the description presented. However, systems, methods and devices provided by the present invention are not only capable of reliably measuring strain in real time, but are also capable of measuring other characteristics of a substrate such as its temperature, pressure and its acoustic characteristics. The system is configured such that a strain sensor element within a strain sensing zone detects substantially the true strain characteristics of the substrate. And while other sensing elements within the same fiber optic sensing cable may not be configured to detect substrate strain at all, these sensing elements may reliably measure the temperature and pressure at the surface of the substrate adjacent to the strain sensing zone.

25 Claims, 7 Drawing Sheets

SYSTEM AND METHOD FOR MONITORING STRAIN

BACKGROUND

The present invention relates generally to systems and methods for measuring strain in objects susceptible to conditions under which strain may develop within the object. In particular, the present invention relates to systems and methods for measuring strain in environments likely to produce strain in components of mechanical systems such as subsurface risers used in off shore hydrocarbon production.

Offshore oil and gas exploration and production are increasingly moving to deeper fields, more remote locations, and more environmentally sensitive waters. This trend is driving the need for longer risers and pipelines as well as more complex subsea processing (separation, compression, and pumping) equipment. The remoteness of these sites and heightened environmental concerns following the Macondo incident in the Gulf of Mexico have led to an industry-wide call for condition monitoring technology for all subsea assets.

Distributed fiber optic sensing technology has already proven to be highly valuable for in-well measurements during hydrocarbon production. A gap in the state-of-the-art is that no single platform exists which can monitor the many parameters that are needed to detect failure modes on subsea umbilicals, risers and flowlines (commonly referred to as SURF). Oil producers are calling for asset monitoring systems that can measure temperature, static and dynamic strain, acoustics, and chemistry, but the cost and complexity of deploying and maintaining multiple systems to achieve comprehensive monitoring of subsurface assets is a significant impediment. Hence, there is a clear need for a single cable solution with an integrated sensing and analytic system which possesses the high speed characteristics of an optical sensing system that is capable of reliably measuring strain, and other characteristics of the asset to be monitored such as temperature, pressure and acoustics.

BRIEF DESCRIPTION

In one embodiment, the present invention provides a system for monitoring strain in a substrate, the system comprising: (a) a fiber optic sensing cable comprising a plurality of strain sensor elements distributed along a length of the cable and defining a plurality of strain sensing zones; and (b) a plurality of cable attachment units, said units comprising: (i) a sensor cover conformal to a surface of the substrate to be monitored and defining a first surface indentation configured to accommodate the cable deployed in contact with the substrate surface and an effective amount of a curable fixative, the sensor cover defining a second surface comprising a plurality of second surface fastener grooves; and (ii) a plurality of fasteners complementary to the fastener grooves and configured to join the sensor cover to the substrate; wherein the first surface indentation is characterized by a length which is at least ten times the length of the strain sensing zone.

In an alternate embodiment, the present invention provides a method of attaching a strain monitoring system to a substrate, the method comprising: (a) deploying a fiber optic sensing cable on a surface of the substrate, the fiber optic sensing cable comprising a plurality of strain sensor elements distributed along a length of the cable and defining a plurality of strain sensing zones; and (b) establishing fixed positions of one or more the strain sensor elements relative to the substrate and one or more cable attachment units, said units comprising: (i) a sensor cover conformal to a surface of the substrate to be monitored and defining a first surface indentation configured to accommodate the cable deployed in contact with the substrate surface and an effective amount of a curable fixative, the sensor cover defining a second surface comprising a plurality of second surface fastener grooves; and (ii) a plurality of fasteners complementary to the fastener grooves and configured to join the sensor cover to the substrate; (c) disposing the sensor cover over the fiber optic sensing cable on the substrate surface such that the strain sensing zone of the fiber optic sensing cable is within the first surface indentation; (d) filling a volume of the first surface indentation with a curable fixative; and (e) joining the sensor cover to the substrate via one or more of the fasteners complementary to the fastener grooves; wherein the first surface indentation is characterized by a length which is at least ten times the length of the strain sensing zone.

In another embodiment, the present invention provides a method of producing a hydrocarbon production fluid, the method comprising: (a) introducing a production fluid derived from a hydrocarbon reservoir effluent fluid into a conduit in fluid communication with the reservoir and a surface receiving facility; (b) causing the production fluid to transit the conduit; and (c) monitoring strain at one or more locations along the conduit; wherein the conduit is equipped with a system for monitoring strain experienced by the conduit, the system comprising: (d) a fiber optic sensing cable comprising a plurality of strain sensor elements distributed along a length of the cable and defining a plurality of strain sensing zones; and (e) a plurality of cable attachment units, said units comprising: (i) a sensor cover conformal to a surface of the conduit and defining a first surface indentation configured to accommodate the cable deployed in contact with the conduit surface and an effective amount of a curable fixative, the sensor cover defining a second surface comprising a plurality of second surface fastener grooves; and (ii) a plurality of fasteners complementary to the fastener grooves and configured to join the sensor cover to the conduit; wherein the first surface indentation is characterized by a length which is at least ten times the length of the strain sensing zone.

In yet another embodiment, the present invention provides a system for monitoring strain in a substrate, the system comprising: (a) a fiber optic sensing cable comprising a plurality of strain sensor elements distributed along a length of the cable and defining a plurality of strain sensing zones; and (b) a plurality of cable attachment units, said units comprising: (i) a sensor cover conformal to a surface of the substrate and defining a first surface indentation accommodating the cable deployed in contact with the substrate surface and an effective amount of a cured fixative, the sensor cover defining a second surface comprising a plurality of second surface fastener grooves; and (ii) a plurality of fasteners complementary to the fastener grooves and joining the sensor cover to the substrate; wherein the first surface indentation is characterized by a length which is at least ten times the length of the strain sensing zone.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, in one or more embodiments the present invention provides a system for monitoring strain in a substrate. While accurate and rapid measurement of strain in a remote substrate presents a major technical challenge and is the focus of much of the description which follows, the systems, methods and devices provided by the present invention are not only capable of reliably measuring strain in real time, but are also capable of measuring other characteristics of a substrate or the surrounding environment such as temperature, pressure and acoustic characteristics. For example, while a strain sensor element 24 (FIG. 1) within a strain sensing zone 28 (FIG. 1) is configured to detect the strain characteristics of the substrate, other sensing elements 25 (FIGS. 2-3) within the same fiber optic sensing cable 20 (FIG. 1) may not be configured to detect substrate strain at all, but may reliably measure the temperature and pressure at the surface of the substrate adjacent to the strain sensing zone.

In one or more embodiments, the present invention relies on the use of a fiber optic sensing cable comprising strain sensor elements along the length of the cable to measure strain within a substrate. The strain sensor elements define strain sensing zones within the fiber optic sensing cable, and in the region of these strain sensor elements the cable must be fixed to the greatest extent possible to the surface of the substrate to assure that in the region of the strain sensor elements the cable experiences substantially the same strain as the substrate. This means that the strain sensor elements reproducibly detect and report at least 60% of the actual strain experienced by the substrate. The fidelity with which the strain sensor elements detect and report the actual strain experienced by the substrate (the true strain on the substrate) will vary and depend on the nature of the substrate and the configuration of the strain sensing zones, the amount of curable fixative employed and its stiffness or elastic modulus after curing, the shape of the substrate surface and the degree to which the first surface of the sensor cover conforms to the substrate surface, and the presence or absence of a space-filling insert in the first surface indentation among other factors. For many types of substrates, pipes for example, a robust correlation of true substrate strain and detected strain may be developed prior to deployment using the systems, methods and devices disclosed herein. Those of ordinary skill in the art will appreciate that imperfect and variable transfer of strain from a substrate to a strain sensor is the rule rather than the exception owing to slippage of the sensor relative to the substrate undergoing strain, and such imperfect and variable transfer of strain will result in an inaccurate assessment of strain within the substrate. Where the substrate is a component of a complex system such as a subsea hydrocarbon production riser, the accurate assessment of strain may be a critical operational issue. In one or more embodiments the substrate is a load supporting system component such as a derrick cross beam.

In one aspect, the present invention provides methodology for attaching a fiber optic sensing cable to a wide variety of substrates using simple components and enables the fiber optic sensing cable to measure strain within the substrate with very high fidelity in very challenging environments, such as benthic and abyssal ocean environments.

Suitable fiber optic sensing cables include fiber optic cables comprising strain sensor elements, for example Bragg grating strain sensor elements. A variety of fiber optic sensing cables adapted for use in subsurface environments are available commercially from AFL (Duncan, S.C.) and Brugg Cables (Brugg, Switzerland), among others.

Figure 1:
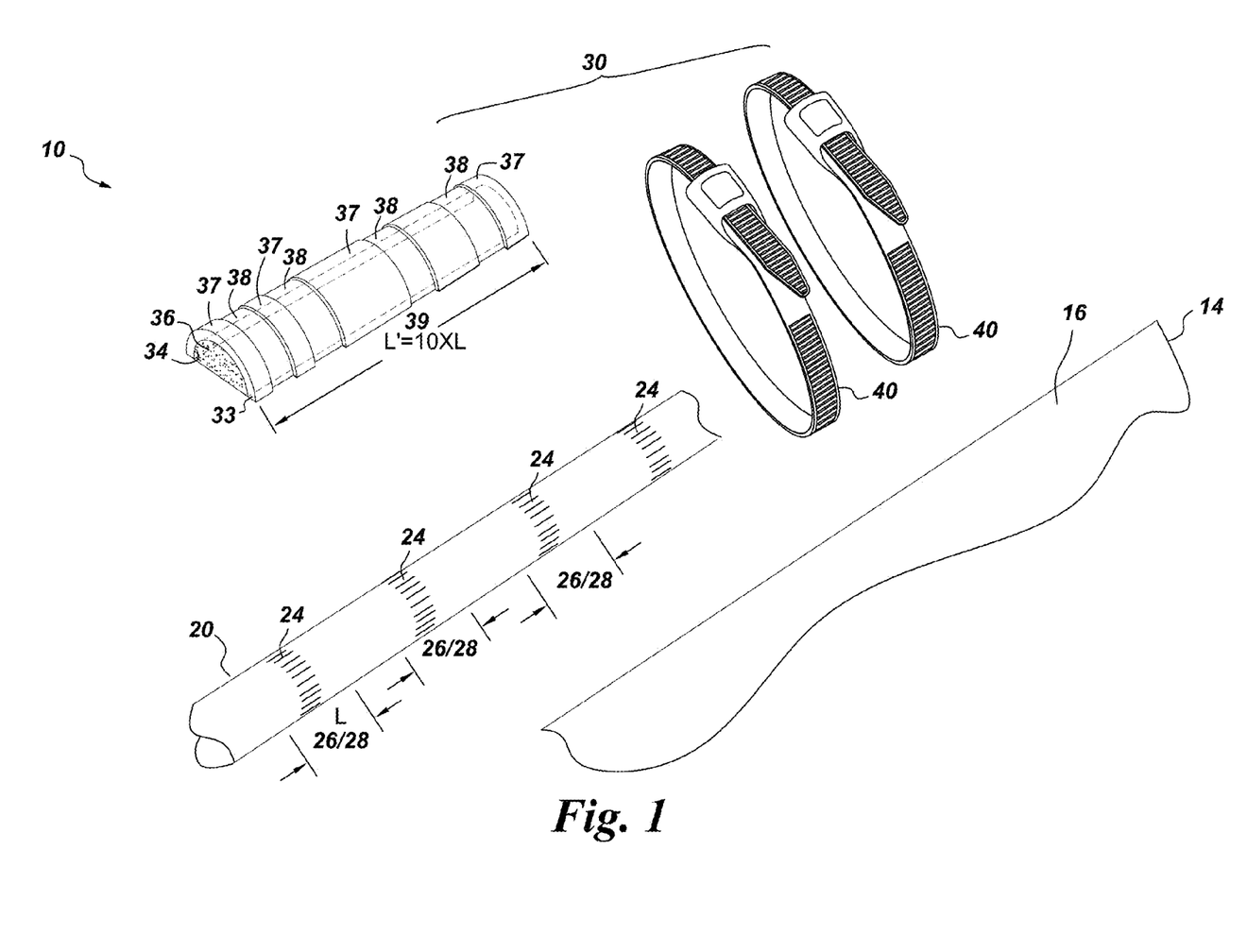
FIG. 1 illustrates a strain monitoring system provided by the present invention.

The figures provide useful guidance on the practice of the invention. Referring to FIG. 1, the figure represents components of a system 10 provided by the present invention useful for monitoring strain in a substrate 14. The system features a fiber optic sensing cable 20 comprising a plurality of strain sensor elements 24 distributed along a length 26 of the cable. In the embodiment shown, the strain sensor elements 24 are represented as Bragg gratings. For convenience, the protective outer layers of the fiber optic sensing cable are not shown. The strain sensor elements are located in portions of the cable referred to as strain sensing zones 28, the strain sensor element being located in the center of the strain sensing zone. A strain sensing zone 28 of the fiber optic sensing cable includes that portion of the fiber optic sensing cable which can reliably transmit strain from the substrate to the strain sensor element within the fiber optic sensing cable. Typically, the strain sensing zone of the fiber optic sensing cable envelops a length of the optical fiber comprising the strain sensor element and portions of the optical fiber on either side of the strain sensor element. For a Bragg grating having an axial length along the optical fiber of about one centimeter, the strain sensing zone of the fiber optic sensing cable associated with such Bragg grating will typically extend along a length 26 of the fiber optic sensing cable of from about one to about three times the length of the Bragg grating itself. Similar relationships between the axial lengths of other types of strain sensor elements and the length of the corresponding strain sensing zone of the fiber optic sensing cable will be apparent to those of ordinary skill in the art having read this disclosure. The fiber optic sensing cable may be attached to the substrate in such a way that when the substrate experiences a certain level of strain, the strain sensing zone of the fiber optic sensing cable experiences a substantially similar level of strain. This is accomplished by securing the fiber optic sensing cable to the surface 16 of the substrate 14 to be monitored using cable attachment units 30 to minimize movement (slippage) of the strain sensing zone relative to the surface of the substrate. The cable attachment units comprise a sensor cover 32 (See FIGS. 5, 6, 8, 9 and 11) which is designed to be conformal with the surface of the substrate and to cover the strain sensing zone. The sensor cover is said to be conformal with the surface of the substrate because it is designed such that the a first surface 33 of the sensor cover is a geometric complement to the substrate surface 16, and with the exception of a first surface indentation 34, itself configured to accommodate a portion of the fiber optic sensing cable, the first surface 33 of the sensor cover 32 fully contacts the surface of the substrate.

As the fiber optic sensing cable is being deployed along the surface of the substrate, the sensor covers 32 (See FIGS. 5, 6, 8, 9 and 11) are placed over the strain sensing zones and are secured to the substrate with fasteners 40. The sensor covers 32 define a second surface 37 opposite the first surface 33. In the embodiment shown, this second surface defines a set of second surface fastener grooves 38 to which the fasteners are complementary and into which the fasteners are inserted and tightened to secure the combination of the strain sensing zone 28 of the fiber optic sensing cable 20 and the sensor cover 32 to the substrate 14.

In one or more embodiments, the first surface indentation 34 contains one or more curable fixatives at the moment the sensor cover is placed over strain sensing zone. Suitable curable fixatives include curable two part epoxy resins, addition curable silicone materials, toughened acrylic structural adhesives, and curable polyurethane resins, for example. The curable fixative may contain curing agents, fillers and like materials to enhance performance. Once cured, the curable fixative both gives the sensor cover greater stiffness and binds together the sensor cover, the fiber optic sensing cable and the substrate. In so doing, strain experienced by the substrate is transferred with greater fidelity to the strain sensing zone of the fiber optic sensing cable and the strain sensor elements. Thus, the strain sensor elements experience and report a level of strain which substantially reproduces the true strain being experienced by the substrate, and which may easily correlated thereto.

The sensor covers 32 are relatively short when compared to the fiber optic sensing cable 20 and are designed such that the sensor cover is at least ten times the length of the strain sensing zone it covers. For example a fiber optic sensing cable having strain sensing zones 28 measuring approximately one and one half (1.5) centimeters along the length of the fiber optic sensing cable would be suitably fixed by a sensor cover having a length 39 of about fifteen (15) centimeters. In one or more embodiments the length of the sensor cover is from about 6 to about 15 centimeters. In an alternate set of embodiments, the length of sensor cover is from about 2 to about 10 centimeters. In one set of embodiments, the length of the strain sensing zone is from about 1 to about 3 centimeters.

As noted, the sensor covers define a first surface 33 which is conformal to the surface of the substrate to which it is to be attached. For complex substrate surfaces, the sensor covers are conveniently prepared using additive manufacturing techniques, at times referred to herein as rapid prototyping, and suitable metallic, plastic or composite precursor materials as are known to those of ordinary skill in the art. For relatively non-complex substrate surfaces more traditional manufacturing techniques such as injection molding may be used to prepare the sensor covers.

In one or more embodiments, both the sensor cover and the first surface indentation are said to define the pitch of a helix in that the first surface indentation may be centered on and aligned with a predetermined helical path along the surface of the substrate, and another component of the sensor cover may define a helical path which is parallel to the predetermined helical path.

Figure 2:
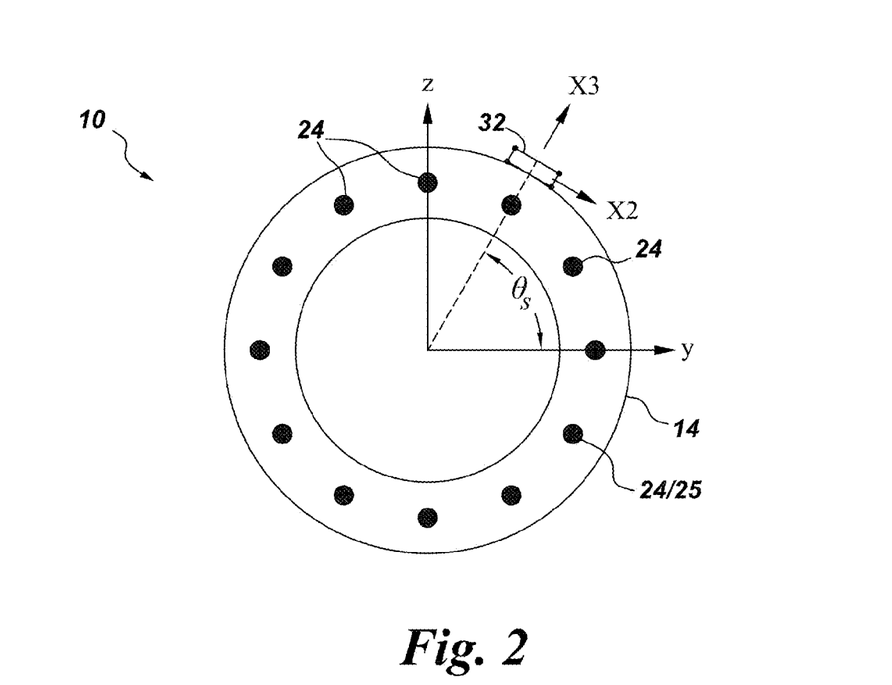
FIG. 2 illustrates one or more features of a strain monitoring system provided by the present invention.

Referring to FIG. 2, the figure represents a view along a length of pipe upon which is deployed a system for measuring strain 10 provided by the present invention. In the embodiment shown, the dark dots represent the locations of the sensing elements of a fiber optic sensing cable deployed along a helical path on the surface of the pipe. In the embodiment illustrated, not all of the sensing elements are strain sensor elements 24. In a typical embodiment of the type illustrated in FIG. 2 less than half the sensing elements would constitute strain sensor elements 24. The remaining sensor elements 25 are available to detect other substrate characteristics such as temperature, pressure and acoustics.

Figure 3:
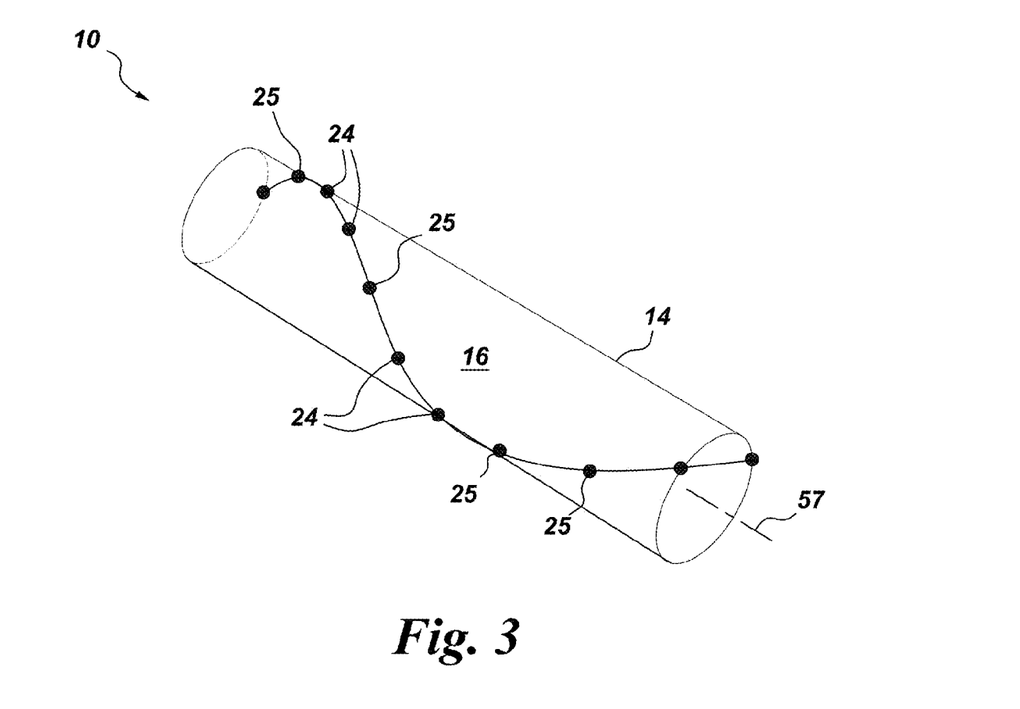
FIG. 3 illustrates one or more features of a strain monitoring system provided by the present invention.

Referring to FIG. 3, the figure represents a three dimensional view of the substrate and system for measuring strain illustrated in FIG. 2. Again, the dark dots indicate the locations of the sensing elements of the fiber optic sensing cable some of which are configured as strain sensor elements 24. For simplicity, cable attachment units 30 are not shown.

Figure 4:
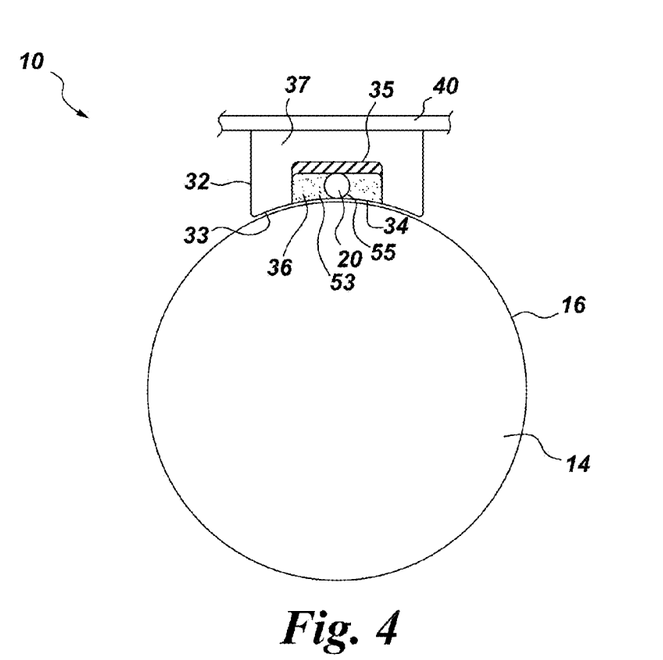
FIG. 4 illustrates a strain monitoring system provided by the present invention.

Referring to FIG. 4, the figure represents a cross sectional view of a system 10 for measuring strain provided by the present invention, the system being deployed on a substrate 14 which is a conduit having a circular shape. The system features a round fiber optic sensing cable 20, a portion of which is disposed within a first surface indentation 34 of a sensor cover 32. Sensor cover 32 comprises a first surface 33 which, with the exception of the first surface indentation 34, conforms to the surface 16 of the substrate conduit. In the embodiment shown, the fiber optic sensing cable extends linearly along the surface of the substrate. Portions of the fiber optic sensing cable comprising strain sensor elements 24 (FIG. 1) are covered individually by sensor covers 32 which envelop the strain sensing zone 28 associated with each strain sensor element 24. In the embodiment shown, the fiber optic sensing cable 20 occupies a volume 55 which is roughly one third of the volume 53 defined by the first surface indentation and the surface 16 of the conduit substrate. That portion of the volume 53 not occupied by the fiber optic sensing cable may be filled initially with a curable fixative 36 which cures and provides a strong bond to the fiber optic sensing cable and the substrate surface. The sensor cover is secured to the substrate by fasteners 40 which fit within complementary fastener grooves 38 (FIG. 1) defined by the outer surface (second surface 37) of the sensor cover. In one or more embodiments, the volume defined by the first surface indentation is from about 2 to about 1000 times a volume occupied within the indentation by the fiber optic sensing cable. In an alternate set of embodiments, the volume defined by the first surface indentation is from about 2 to about 10 times a volume occupied within the indentation by the fiber optic sensing cable. In yet another set of embodiments, the volume defined by the first surface indentation is from about 1.5 to about 2 times a volume occupied within the indentation by the fiber optic sensing cable. In the embodiment shown, a space filling insert 35 is present within the first surface indentation. In one or more embodiments, such space filling inserts may provide for greater control of contact pressure between the sensor cover and the surface of the substrate.

Figure 5:
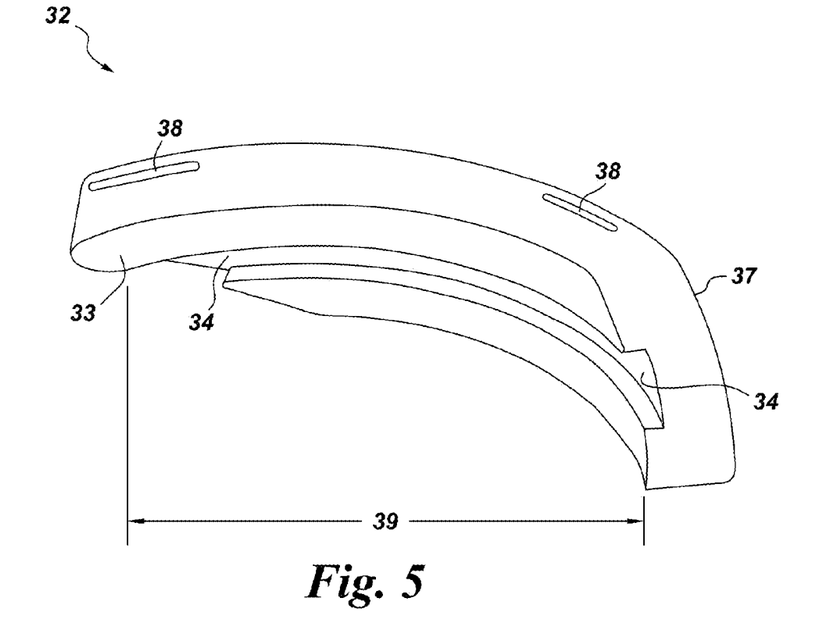
FIG. 5 illustrates one or more features of a strain monitoring system provided by the present invention.

Referring to FIG. 5, the figure represents a sensor cover 32 for use in a system for measuring strain 10 provided by the present invention. In the embodiment shown, the sensor cover is configured to conform to the surface of a substrate having a cylindrical shape. A first surface 33 of the sensor cover defines first surface indentation 34 which extends the length 39 of the sensor cover and divides into two equal parts the portion of the first surface not constituting the first surface indentation. The sensor cover comprises a second surface 37 and a pair of fastener grooves 38. In the embodiment shown, fastener grooves 38 are internal and traverse the body of the sensor cover 32 without being structural features defined by the second surface. This concept may be further illustrated by contrasting the internal fastener grooves 38 of the sensor cover 32 shown in FIG. 5 with the open fastener grooves illustrated in FIG. 1 and elsewhere in this disclosure.

Figure 6:
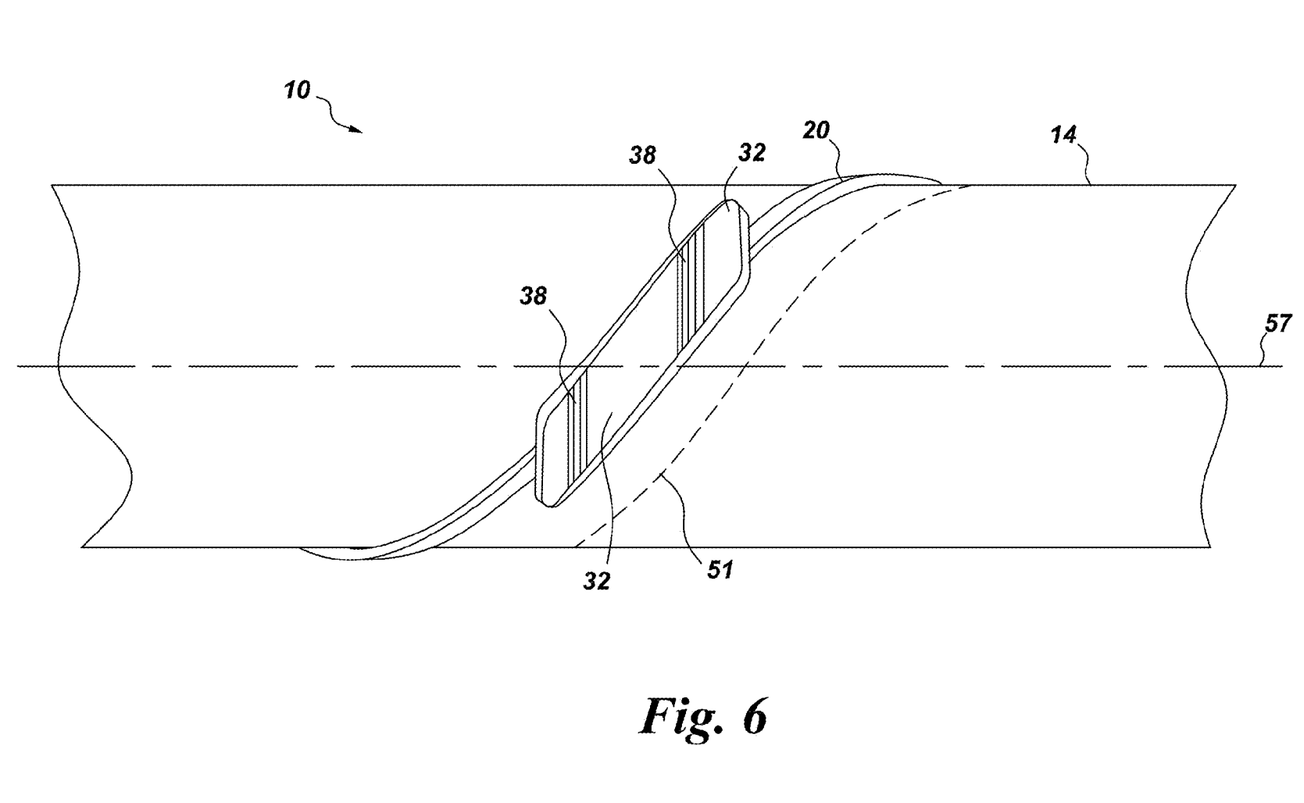
FIG. 6 illustrates one or more features of a strain monitoring system provided by the present invention.

Referring to FIG. 6, the figure represents a system for measuring strain 10 provided by the present invention deployed on the surface 16 of a substrate 14 which is a marine production riser used to transport a hydrocarbon production fluid from a subsea installation to a surface facility. In the embodiment shown, one of a plurality of sensor covers 32 is shown covering a strain sensing zone 28 of a fiber optic sensing cable 20 having a flattened shape and comprising a plurality of strain sensor elements 24. The system for measuring strain is deployed such that the fiber optic sensing cable tracks a helical path 51 along the principal axis 57 of the substrate. Sensor cover 32 is secured to the substrate by a pair of fasteners 40 (not shown) which are complementary in dimensions to fastener grooves 38. In the embodiment shown, fastener grooves 38 are oriented orthogonal to the principal axis 57 of the substrate. Such orthogonal orientation of the fastener grooves to the principal axis of the substrate is believed to inhibit slippage of the strain sensing zone of the fiber optic sensing cable as the substrate experiences strain and transfers strain to the strain the strain sensing zone, the fiber optic sensing cable and the sensor cover.

Figure 7:
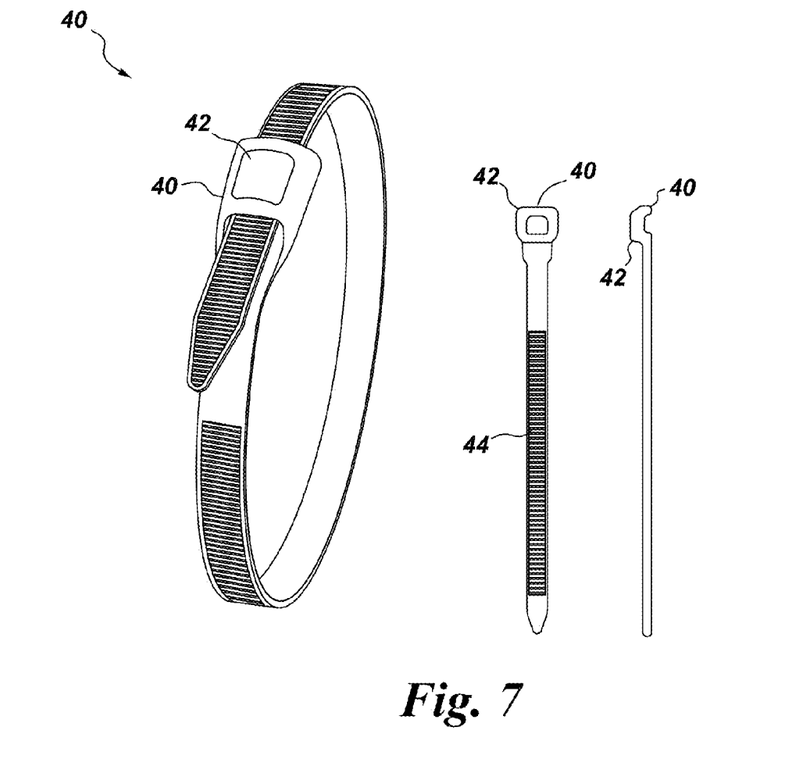
FIG. 7 illustrates one or more features of a strain monitoring system provided by the present invention.

Referring to FIG. 7, the figure represents commercially available tie fasteners suitable for use in one or more embodiments of the present invention (HCL Fasteners, Houston, Tex.). As shown in FIG. 7, the tie fasteners 40 comprise a fastener lock 42 and locking grooves 44 which prevent loosening of the fastener once secured to the substrate.

Figure 8:
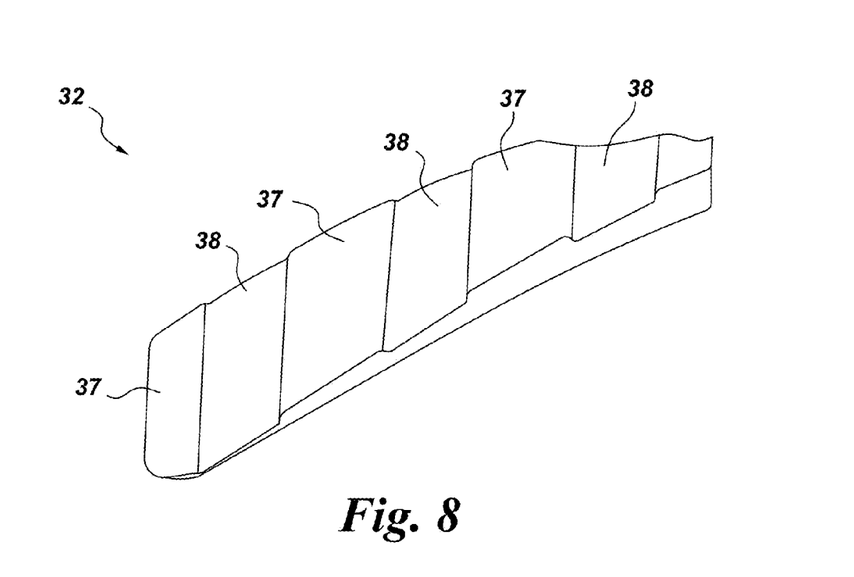
FIG. 8 illustrates one or more features of a strain monitoring system provided by the present invention.

Referring to FIG. 8, the figure represents a portion of a sensor cover 32 the second surface 37 of which defines a plurality of fastener grooves 38.

Figure 9:
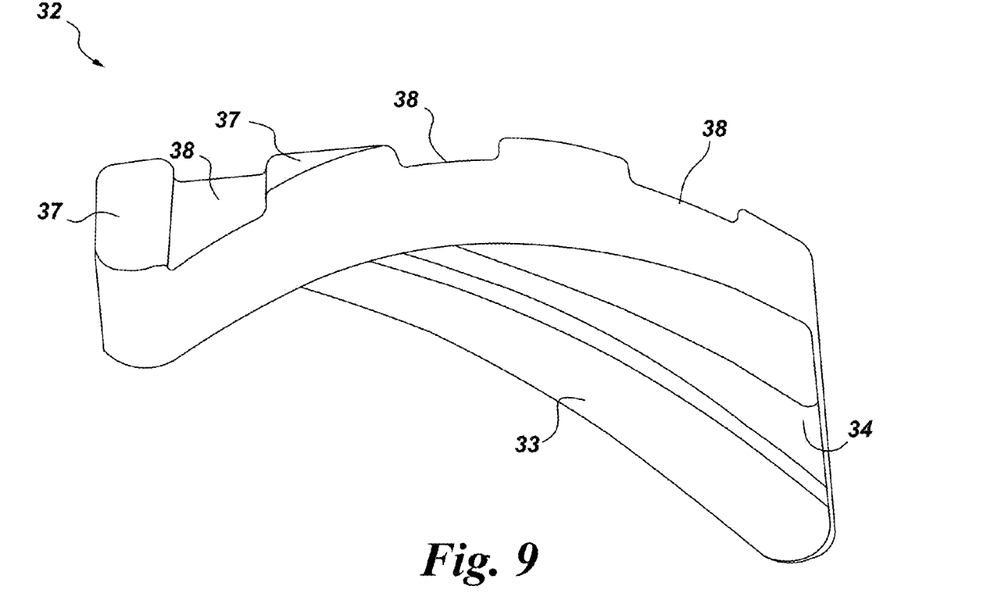
FIG. 9 illustrates one or more features of a strain monitoring system provided by the present invention.

Referring to FIG. 9, the figure represents a view from below of the sensor cover 32 depicted in FIG. 8. The sensor cover first surface 33 is visible as is a portion of first surface indentation 34 which extends along the length of the sensor cover.

Figure 10:
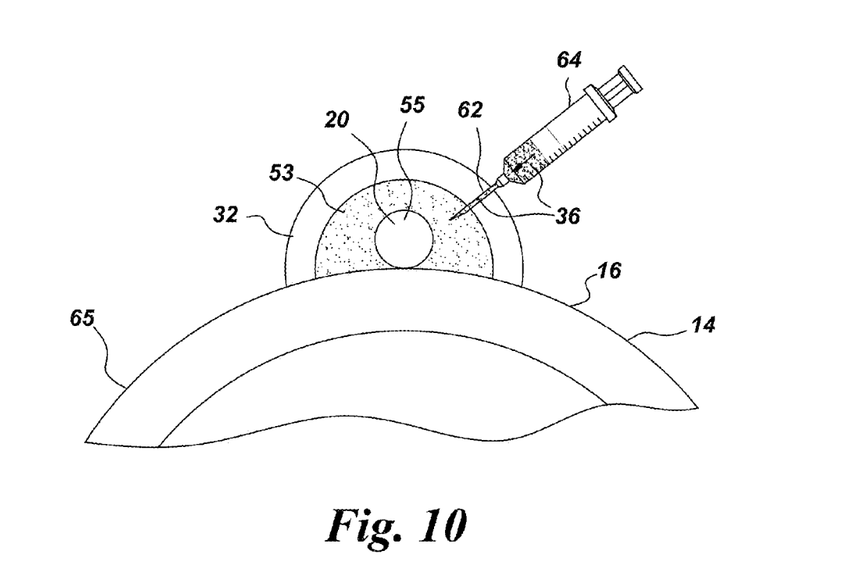
FIG. 10 illustrates one or more features of a strain monitoring system provided by the present invention.

Referring to FIG. 10, the figure represents a system for measuring strain 10 provided by the present invention and deployed upon the outer surface 16 of a fluid conduit 65. The sensor cover 32 comprises a channel 62 through which one or more curable fixatives may be introduced into the volume 53 defined by the first surface indentation 34 and the surface of the substrate 16. Channel 62 is disposed between the first surface indentation 34 and the second surface. In the embodiment shown, the curable fixative 36 may be introduced into volume 53 via channel 62 using injector 64.

Figure 11:
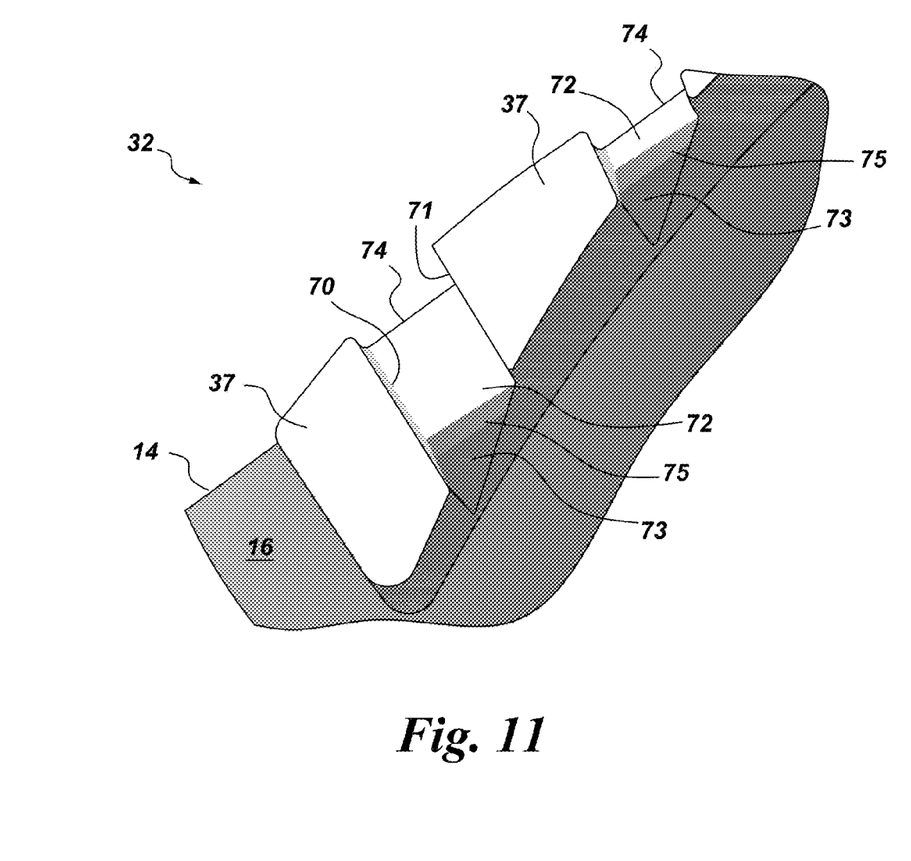
FIG. 11 illustrates one or more features of a strain monitoring system provided by the present invention.

Referring to FIG. 11, the figure represents a portion of a sensor cover 32 wherein the second surface fastener grooves 38 include two vertical surfaces 70 and 71 and three non-vertical surfaces: a central rectangular surface 72 which conforms to the surface topology of the second surface 37 adjacent to the groove, and two right-triangular surfaces 73 and 74 which define beveled edges of the groove. Each of these beveled edges of the groove is separated from the central rectangular surface 72 by a transition zone 75. In one or more embodiments, the transition zone or a combination of transition zones may track a predetermined path along the surface of the substrate. For example, transition zones associated with surfaces 73 and 74 of adjacent grooves may define a helical path 51 (FIG. 6) parallel to a helical path defined by the first surface indentation 34. For reasons not entirely understood, beveled surfaces 73 and 74 confer a special advantage as the sensor cover 32 is being secured to the surface of the substrate. Without the beveled surfaces the unsecured end of the sensor cover tends to move relative to the surface of the substrate during the attachment of the first fastener to the sensor cover. Unintended movement of the sensor cover can create uncertainty as to the position of the strain sensing zone 28 of the fiber optic sensing cable 20 within the first surface indentation and this in turn can inhibit reliable strain transfer between the substrate and the strain sensor element 24 within the strain sensing zone 28. Sensor covers equipped with beveled surfaces such as 73 and 74 tend not to move during the attachment of the first fastener to the sensor cover and help to reliably center the strain sensing zone and its strain sensor element within the first surface indentation.

As noted, in one or more embodiments, the present invention provides a method of attaching a strain monitoring system to a substrate. The method comprises: (a) deploying a fiber optic sensing cable on a surface of the substrate, the fiber optic sensing cable comprising a plurality of strain sensor elements distributed along a length of the cable and defining a plurality of strain sensing zones; and (b) establishing fixed positions of one or more the strain sensor elements relative to the substrate and one or more cable attachment units, said units comprising: (i) a sensor cover conformal to a surface of the substrate to be monitored and defining a first surface indentation configured to accommodate the cable deployed in contact with the substrate surface and an effective amount of a curable fixative, the sensor cover defining a second surface comprising a plurality of second surface fastener grooves; and (ii) a plurality of fasteners complementary to the fastener grooves and configured to join the sensor cover to the substrate; (c) disposing the sensor cover over the fiber optic sensing cable on the substrate surface such that the strain sensing zone of the fiber optic sensing cable is within the first surface indentation; (d) filling a volume of the first surface indentation with a curable fixative; and (e) joining the sensor cover to the substrate via one or more of the fasteners complementary to the fastener grooves; wherein the first surface indentation is characterized by a length which is at least ten times the length of the strain sensing zone. In one or more embodiments, step (e) precedes step (d). In an alternate set of embodiments, step (d) precedes step (e). In yet another set of embodiments, step (d) precedes step (c). Suitable curable fixatives include those discussed herein. In one set of embodiments, the curable fixative comprises a curable epoxy resin which optionally comprises a solid filler material.

As noted, in one or more embodiments, the present invention also provides a method of producing a hydrocarbon production fluid, the method comprising: (a) introducing a production fluid from a hydrocarbon reservoir into a conduit in fluid communication with the reservoir and a surface receiving facility; (b) causing the production fluid to transit the conduit; and (c) monitoring strain at one or more locations along the conduit; wherein the conduit is equipped with a system for monitoring strain experienced by the conduit, the system comprising: (d) a fiber optic sensing cable comprising a plurality of strain sensor elements distributed along a length of the cable and defining a plurality of strain sensing zones; and (e) a plurality of cable attachment units, said units comprising: (i) a sensor cover conformal to a surface of the conduit and defining a first surface indentation configured to accommodate the cable deployed in contact with the conduit surface and an effective amount of a curable fixative, the sensor cover defining a second surface comprising a plurality of second surface fastener grooves; and (ii) a plurality of fasteners complementary to the fastener grooves and configured to join the sensor cover to the conduit; wherein the first surface indentation is characterized by a length which is at least ten times the length of the strain sensing zone. The method is enhanced relative to known methods by virtue of its incorporation of one or more embodiments the system for measuring strain disclosed herein. In one or more embodiments, the method further comprises a step of separating the hydrocarbon reservoir effluent fluid into a gas-rich fluid and a liquid-rich production fluid.

Experimental Part

General Procedures

Fiber optic cables were obtained from AFL Cables. Sensor covers were prepared on a rapid prototyping device and were comprised of an ABS-like polymer. The fasteners used to attach the sensor cover to the surface of the substrate were commercially available from HCL Fasteners, part number Smart Tie (ST-20-750). The curable fixative employed was an uncured acrylic adhesive obtained from 3M under the trade name DP825.

The fiber optic sensing cable may be arrayed along the substrate surface in a variety of ways including: a linear arrangement in which the fiber optic sensing cable is aligned with an axis of the substrate; a non-linear arrangement in which the fiber optic sensing cable is not aligned with an axis of the substrate; and a non-linear, but periodic arrangement such as a helix having a predetermined pitch. When deploying the fiber optic sensing cable in a helical arrangement along a linear substrate such as a pipe, the substrate is first marked with a helical path having a predetermined helix pitch and regularly spaced sensor positions along the helix path. The fiber optic cable comprising strain sensors is then draped about the pipe along the helical path and the strain sensor elements of the cable are aligned with the predetermined sensor positions along the pipe.

Cable attachment units are used to secure the fiber optic cable to the outer surface of the pipe. For example, the cable attachment units may comprise a sensor cover designed to be conformal with a pipe having a six (6) inch diameter along a helical path having a pitch of twenty-four (24) inches. The surface of the sensor cover designed for contact with the outer surface of the pipe, the first surface, defines a first surface indentation which is of uniform dimensions of approximately one (1) centimeter wide and one (1) centimeter deep and which conforms along the length of the indentation to the helical path having a pitch of twenty-four inches. The surface of the sensor cover opposite the first surface, the second surface, defines a pair of fastener grooves having a width of approximately two and one half (2.5) centimeters and a length of approximately five (5) centimeters. The inner portions of the grooves define three non-vertical surfaces and two vertical surfaces. The three non-vertical surfaces include a central rectangular surface which conforms to the surface topology of the second surface adjacent to the groove, and two right-triangular surfaces which define the beveled edges of the groove. Each of the beveled edges of the groove is separated from the central rectangular surface by a transition zone which tracks the pitch of the helix. The sensor cover is approximately five (5) centimeters in width and is approximately fifteen (15) centimeters in length. The sensor cover varies in thickness from about one and one half (1.5) to about two (2) centimeters in zones not constituting either a first surface indentation or a second surface fastener groove.

The sensor covers are then placed over the fiber optic cable such that the Bragg gratings of the fiber optic cable constituting the strain sensor elements are positioned at or near the mid-point of the first surface indentation and the fiber optic cable is disposed within the first surface indentation along the length of the first surface indentation. The sensor covers are then secured to the pipe with the fasteners. The ABS-like polymer constituting the sensor cover is sufficiently stiff that it does not deform appreciably upon fully tightening the fasteners.

The curable fixative may be incorporated by filling the first surface indentation with the curable fixative just prior to placing the sensor cover over the fiber optic cable. Alternatively, the curable fixative may be injected into the remaining portion of the first surface indentation not occupied by the fiber optic cable after placing the sensor cover over the fiber optic cable. This may be accomplished either by providing one or more channels from the second surface to the first surface indentation and injecting the curable fixative through the channel and into the first surface indentation, or by injecting the curable fixative into the first surface indentation via one or both ends of the first surface indentation.

In some embodiments, the cable attachment unit includes a space-filling insert disposed within the first surface indentation. The space-filling insert may be centered within the first surface indentation such that when the sensor cover is placed over the fiber optic sensing cable the space-filling insert contacts the fiber optic sensing cable. In some instances, the space-filling insert is made of a material which is less stiff than the sensor cover itself. This allows for additional pressure control as the sensor cover is secured to the substrate with the fasteners. The space-filling insert may completely envelop the strain sensing zone of the fiber optic sensing cable and yet not occupy the entire length of the first surface indentation, thus providing space at the ends of the first surface indentation for the insertion of one or more curable fixatives. The sensor cover and the space-filling insert may configured such that when deployed, the strain sensor element of the fiber optic sensing cable is simultaneously centered at both the midpoint of the space-filling insert and at the midpoint of the first surface indentation.

Strain Measurements

A length of aluminum pipe (six inch aluminum schedule 10) was employed as a test substrate for strain measurements. The pipe measured slightly more than six feet in length and was supported at each end by V stands. For load induced mechanical strain measurements an inverted U hanger was attached to the midpoint of the pipe.

A mechanical strain gage from Vishay Precision Group (Raleigh, N.C.) was used to measure the true strain and to cross-correlate such true with the strain values measured by the strain sensor element of the fiber optic sensing cable. The mechanical strain gage and the strain sensor element of the fiber optic sensing cable were arrayed equidistant from the pipe midpoint where the test loads were attached to the U hanger. For convenience and given space constraints, the mechanical strain gage and the strain sensor element were offset from the loading point by about four inches. Unless otherwise indicated, load increments of twenty pounds were employed and varied at thirty second intervals. Data are gathered in Tables 1, 2 and 3 below.

Data presented Table 1 compares the strain measured by the mechanical strain gage with the system for measuring strain provided by the present invention under a static load of 160 pounds. Strain units are expressed as microstrain units ($\mu e$). In this test, the cable attachment unit comprised a 40 Shore A silicone rubber space-filling insert centered over the strain sensing zone of the fiber optic sensing cable but did not include a curable fixative. The data indicate that the strain sensor element reliably detects and substantially reproduced the true strain measured by the mechanical strain gage. A reliable correlation between the actual strain and the strain detected by the strain sensor element of the fiber optic sensing cable may be discerned in the strain ratio of 63.5%

TABLE 1

True Strain Versus Strain Sensor Element Detected Strain (Static Load)

| Load (lb) | Mechanical Strain Gage ($\mu e$) | Strain Sensor Element ($\mu e$) | Strain Ratio |
|---|---|---|---|
| 160 | 118 | 77 | 65.3% |

Data gathered in Table 2 compare the performance of the system for measuring strain provided by the present invention which comprised a 40 Shore A silicone rubber space-filling insert centered over the strain sensing zone of the fiber optic sensing cable. The cable attachment unit did not include a curable fixative within the first surface indentation. The data show that at all load levels the strain level sensed by the strain sensor element of the fiber optic sensing cable substantially reproduced the true strain measured by the mechanical strain gage and a reliable correlation between the actual strain and the strain detected by the strain sensor element of the fiber optic sensing cable may be discerned in the strain ratio.

TABLE 2

True Strain Versus Strain Sensor Element Detected Strain (Variable Load)

| Load (lb) | Mechanical Strain Gage ($\mu e$) | Strain Sensor Element ($\mu e$) | Strain Ratio |
|---|---|---|---|
| 0 | 0 | 0 | |
| 20 | 15 | 10 | 66.7% |
| 40 | 30 | 20 | 66.7% |
| 60 | 44 | 28 | 63.6% |
| 80 | 59 | 37 | 62.7% |
| 100 | 74 | 46 | 62.2% |
| 120 | 84 | 56 | 66.7% |
| 140 | 103 | 66 | 64.1% |
| 160 | 118 | 76 | 64.4% |

Data gathered in Table 3 compare the performance of the system for measuring strain provided by the present invention which comprised a 40 Shore A silicone rubber space-filling insert centered over the strain sensing zone of the fiber optic sensing cable. Beads of the acrylic adhesive DP825 (3M) were inserted at the first surface indentation inlet and outlet. The data show that at all load levels the strain level sensed by the strain sensor element of the fiber optic sensing cable substantially reproduced the true strain measured by the mechanical strain gage and a reliable correlation between the actual strain and the strain detected by the strain sensor element of the fiber optic sensing cable may be discerned in the strain ratio which averaged 68.9%.

TABLE 3

True Strain Versus Strain Sensor Element Detected Strain (Variable Load)

| Load (lb) | Mechanical Strain Gage ($\mu e$) | Strain Sensor Element ($\mu e$) | Strain Ratio |
|---|---|---|---|
| 100 | 69 | 45 | 65.2% |
| 80 | 55 | 37 | 67.3% |
| 60 | 42 | 29 | 69.0% |
| 40 | 28 | 20 | 71.4% |
| 20 | 14 | 10 | 71.4% |
| 0 | 0 | 0 | |
| | | Average | 68.9 |

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A system for monitoring strain in a substrate, the system comprising:
    (a) a fiber optic sensing cable comprising a plurality of strain sensor elements distributed along a length of the cable and defining a plurality of strain sensing zones; and
    (b) a plurality of cable attachment units, said units comprising:
        (i) a sensor cover conformal to a surface of the substrate to be monitored and defining a first surface indentation configured to accommodate the cable deployed in contact with the substrate surface and an effective amount of a curable fixative, the sensor cover defining a second surface comprising a plurality of second surface fastener grooves; and
        (ii) a plurality of fasteners complementary to the fastener grooves and configured to join the sensor cover to the substrate;

wherein the first surface indentation is characterized by a length which is at least ten times the length of the strain sensing zone.

2. The system according to claim 1, wherein the fiber optic sensing cable is capable of monitoring at least one of an acoustic parameter, a temperature parameter, and a pressure parameter associated with the substrate.

3. The system according to claim 1, wherein the plurality of strain sensor elements comprise Bragg gratings.

4. The system according to claim 1, wherein the length of the strain sensing zone is from about 1 to about 3 centimeters.

5. The system according to claim 1, wherein the sensor cover and the first surface indentation define a pitch of a helix.

6. The system according to claim 1, wherein the curable fixative is a curable epoxy or acrylic resin.

7. The system according to claim 6, wherein the curable resin comprises a solid filler material.

8. The system according to claim 1, wherein a volume defined by the first surface indentation is from about 2 to about 1000 times a volume occupied within the indentation by the fiber optic sensing cable.

9. The system according to claim 1, wherein the sensor cover comprises at least one channel disposed between the first surface indentation and the second surface.

10. The system according to claim 1, wherein plurality of fasteners are tie fasteners.

11. The system according to claim 10, wherein the second surface fastener grooves are oriented orthogonal to a principal axis of the substrate.

12. The system according to claim 1, wherein the substrate is a component of a mechanical system susceptible to variable strain levels.

13. The system according to claim 12, wherein the substrate is a fluid conduit.

14. The system according to claim 13, wherein the substrate is a marine riser.

15. The system according to claim 12, wherein the substrate is a load supporting system component.

16. A method of attaching a strain monitoring system to a substrate, the method comprising:
    (a) deploying a fiber optic sensing cable on a surface of the substrate, the fiber optic sensing cable comprising a plurality of strain sensor elements distributed along a length of the cable and defining a plurality of strain sensing zones; and
    (b) establishing fixed positions of one or more the strain sensor elements relative to the substrate and one or more cable attachment units, said units comprising:
        (i) a sensor cover conformal to a surface of the substrate to be monitored and defining a first surface indentation configured to accommodate the cable deployed in contact with the substrate surface and an effective amount of a curable fixative, the sensor cover defining a second surface comprising a plurality of second surface fastener grooves; and
        (ii) a plurality of fasteners complementary to the fastener grooves and configured to join the sensor cover to the substrate;
    (c) disposing the sensor cover over the fiber optic sensing cable on the substrate surface such that the strain sensing zone of the fiber optic sensing cable is within the first surface indentation;
    (d) filling a volume of the first surface indentation with a curable fixative; and
    (e) joining the sensor cover to the substrate via one or more of the fasteners complementary to the fastener grooves;
wherein the first surface indentation is characterized by a length which is at least ten times the length of the strain sensing zone.

17. The method according to claim 16, wherein step (e) precedes step (d).

18. The method according to claim 16, wherein the curable fixative comprises a curable epoxy or acrylic resin.

19. The method according to claim 16, wherein the curable fixative comprises a solid filler material.

20. A method of producing a hydrocarbon production fluid, the method comprising:
    (a) introducing a production fluid derived from a hydrocarbon reservoir effluent fluid into a conduit in fluid communication with the reservoir and a surface receiving facility;
    (b) causing the production fluid to transit the conduit; and
    (c) monitoring strain at one or more locations along the conduit;
    wherein the conduit is equipped with a system for monitoring strain experienced by the conduit, the system comprising:
        (d) a fiber optic sensing cable comprising a plurality of strain sensor elements distributed along a length of the cable and defining a strain sensing zone; and
        (e) a plurality of cable attachment units, said units comprising:
            (i) a sensor cover conformal to a surface of the conduit and defining a first surface indentation configured to accommodate the cable deployed in contact with the conduit surface and an effective amount of a curable fixative, the sensor cover defining a second surface comprising a plurality of second surface fastener grooves; and
            (ii) a plurality of fasteners complementary to the fastener grooves and configured to join the sensor cover to the conduit;
    wherein the first surface indentation is characterized by a length which is at least ten times the length of the strain sensing zone.

21. The method according to claim 20, further comprising a step of separating the hydrocarbon reservoir effluent fluid into a gas-rich fluid and a liquid-rich production fluid.

22. A system for monitoring strain in a substrate, the system comprising:
    (a) a fiber optic sensing cable comprising a plurality of strain sensor elements distributed along a length of the cable and defining a plurality of strain sensing zones; and
    (b) a plurality of cable attachment units, said units comprising:
        (i) a sensor cover conformal to a surface of the substrate and defining a first surface indentation accommodating the cable deployed in contact with the substrate surface and an effective amount of a cured fixative, the sensor cover defining a second surface comprising a plurality of second surface fastener grooves; and
        (ii) a plurality of fasteners complementary to the fastener grooves and joining the sensor cover to the substrate;
    wherein the first surface indentation is characterized by a length which is at least ten times the length of the strain sensing zone.

23. The system according to claim 22, wherein the fiber optic sensing cable is capable of monitoring at least one of an acoustic parameter, a temperature parameter, and a pressure parameter associated with the substrate.

24. The system according to claim 22, wherein the plurality of strain sensor elements comprise Bragg gratings.

25. The system according to claim 22, wherein the sensor cover and the first surface indentation define a pitch of a helix.

* * * * *